United States Patent [19]

Leibrand, Sr. et al.

[11] 4,326,492

[45] Apr. 27, 1982

[54] METHOD AND APPARATUS FOR PREHEATING FUEL

[75] Inventors: John G. Leibrand, Sr.; Marlin L. Bessey, both of Idaho Falls, Id.

[73] Assignee: Runfree Enterprise, Inc., Ucon, Id.

[21] Appl. No.: 137,723

[22] Filed: Apr. 7, 1980

[51] Int. Cl.³ ............................................ F02M 31/00
[52] U.S. Cl. ................................ 123/557; 165/104.19; 123/514; 123/553
[58] Field of Search ............... 123/557, 553, 548, 514; 165/104.11, 104.19

[56] References Cited

U.S. PATENT DOCUMENTS

| | | | |
|---|---|---|---|
| 2,048,104 | 7/1936 | Clinefelter | 165/104.19 |
| 2,103,947 | 12/1937 | Holmes | 165/104.11 |
| 2,104,974 | 1/1938 | Dawes | 165/104.11 |
| 2,205,388 | 6/1940 | Boatright | 165/104.19 |
| 2,357,947 | 9/1944 | Gerson | 123/557 |
| 2,458,826 | 1/1949 | Blumberg | 123/557 |
| 2,669,847 | 2/1954 | Dick | 165/104.19 |
| 3,253,647 | 5/1966 | Deshaies | 123/557 |
| 3,927,651 | 12/1975 | Harrow | 123/557 |
| 3,935,849 | 2/1976 | Mills | 123/557 |
| 4,009,701 | 3/1977 | Ruf | 123/547 |
| 4,030,453 | 6/1977 | Sugimoto | 123/557 |
| 4,126,111 | 11/1978 | Hafner | 123/557 |
| 4,159,698 | 7/1979 | Berenbaum | 123/557 |

Primary Examiner—Ronald H. Lazarus
Attorney, Agent, or Firm—Huebner & Worrel

[57] ABSTRACT

A method and apparatus for preheating fuel which employs a canister concentrically mounted on an exhaust pipe of an internal combustion engine, a fuel line through which fuel flows from the engine and which is helically wound within the canister about the pipe in radially spaced relation to the pipe, and a heat transfer fluid within the canister which surrounds the pipe and the line and is substantially the sole conductor of heat from the pipe to the line.

3 Claims, 8 Drawing Figures

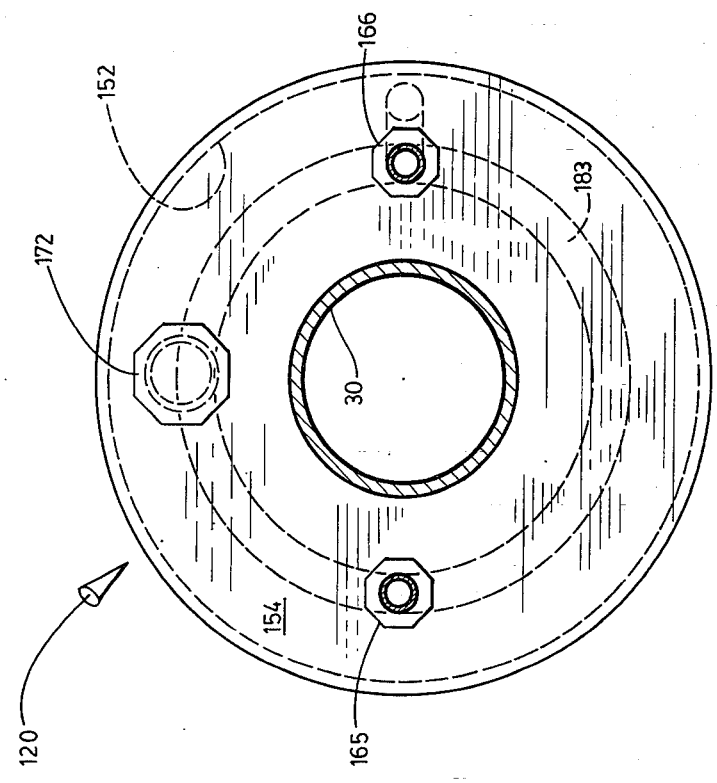
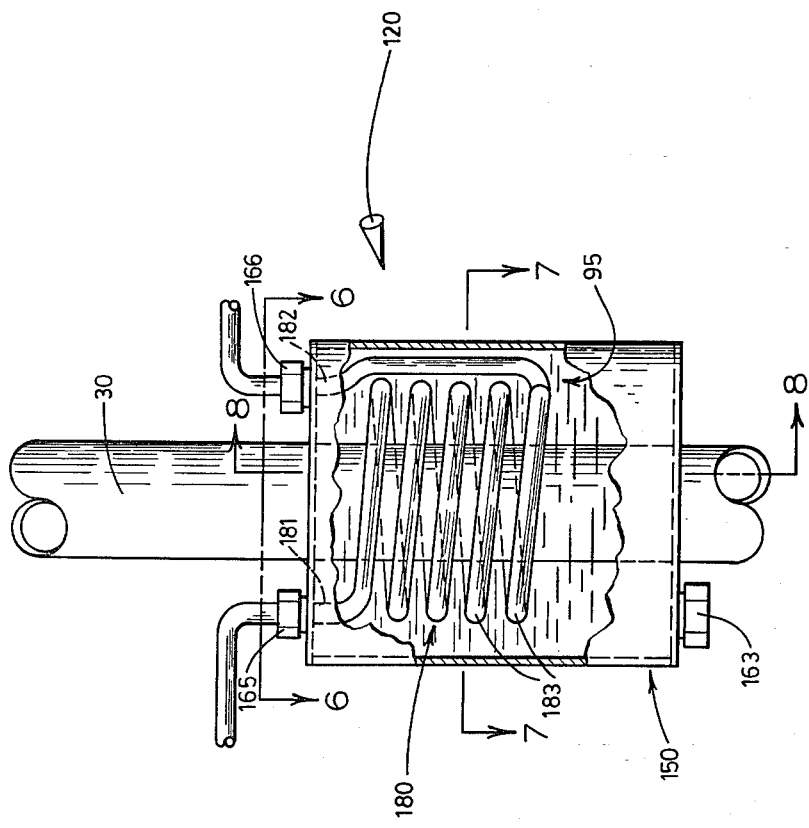

METHOD AND APPARATUS FOR PREHEATING FUEL

BACKGROUND OF THE INVENTION

1. Field of the Invention

The present invention relates to a method and apparatus for preheating fuel, and more particularly to such a method and apparatus for use with a diesel internal combustion engine to prevent fuel system blockage in cold weather due to crystallization in, or separation of, wax and the like from the fuel.

2. Description of the Prior Art

When the temperature of diesel fuel becomes sufficiently low, certain components of the fuel solidify into wax. This wax then blocks elements of a fuel system through which the fuel flows. The fuel filter of such a system is particularly prone to such blockage due to the minute openings required for effective filtration. Such "waxing" is especially prevalent at the present time due to the use of heavier grades of petroleum products in fuel oil to increase fuel production when crude oil is in short supply.

Engine stoppage due to "waxing" is particularly expensive in diesel powered vehicles, such as commercial trucks, which must be supplied with whatever fuel is available along the road, have their fuel tanks exposed to the ambient temperature, and must be serviced at considerable difficulty and expense, or retrieved for repair when the cause of engine stoppage is not obvious or cannot be corrected on the road.

In the past, it was possible to reduce "waxing" by mixing No. 1 fuel oil, a lighter grade, with No. 2; however, the present shortage of lighter grade petroleum products makes this prohibitively expensive even when No. 1 fuel oil is available. It is also well known to mix anti-waxing additives with diesel oil. However, such additives add to the cost of operation at best, must be carefully mixed, are relatively ineffective once wax has formed, and may not be effective if the fuel, as is frequently the case, contains water or is already mixed with additives. Stoppage of engines due to fuel filter waxing can, of course, be reduced by changing the fuel filter frequently. However, daily changes are sometimes required for commercial trucks and such frequent changes are relatively expensive, are likely to be neglected, and are not completely effective in cold weather or when heavy fuel is used.

Due to the above-described difficulties, it is well known to maintain diesel fuel at above approximately 60° F. (15.6° C.) where wax does not form in the fuel. It is, however, necessary to prevent the fuel temperature from rising substantially over 100° F. (37.7° C.) for proper lubrication and cooling of the fuel injectors of a diesel engine and to prevent the formation of harmful substances in the fuel. Prior art fuel-heating devices have, therefore, been provided with temperature-sensitive controls which actuate valves or the like to maintain fuel temperatures in the desired range. These controls are relatively expensive and have moving parts which are subject to wear and breakage. Such controls are particularly disadvantageous on diesel-powered vehicles which are subject to road shocks and high and low temperature extremes and where the controls cannot be attended to or replaced during operation.

The necessary heat for certain prior art fuel-heating devices has been obtained from engine coolant. Deriving heat from engine or transmission lubricant has been considered. Since these fluids must be conducted from and returned to the engine or transmission, the necessary plumbing is relatively involved, presents the danger of leaks, and where lubricants are used, of fire. Further, the additional cooling of coolants and lubricants when heat is transferred to the fuel may result in undesirably low coolant or lubricant temperatures. Since these heat sources are at a relatively low temperature, the required heat-transfer surface for effective heating in cold weather is relatively large. However, controls are still needed to prevent overheating of the fuel when the coolant or lubricant temperature is high and/or when the weather is hot. The use of coolants or lubricants for heating is also disadvantageous since their temperatures remain low for some time after starting and during idle operation. As a result, the danger of waxing is still present during these conditions.

The use of exhaust heat to heat internal combustion engine fuel, including diesel oil to prevent waxing, is well known. The use of heat from the engine exhaust eliminates a number of the above-described problems, such as the need for extra plumbing. However, the relatively high exhaust temperature, having a range of 250° to 900° F. (121° to 482° C.), which is beneficial in certain respects, easily produces excessive fuel temperatures. The exhaust temperature also changes substantially instantaneously when load on the engine changes. As a result, the prior art devices using exhaust heat for diesel fuel heating require either sensitive, rapid-acting, and therefore, expensive and relatively fragile control elements or other complications to prevent occasionally excessively high fuel temperatures.

Prior art devices for heating fuel having employed a coil of metallic tubing wound tightly about a metallic conduit through which the exhaust gases flow from an internal combustion engine. This provides a relatively simple, economical, and rugged fuel heating device. However, direct control of the heating coil temperature is not possible when the coil engages the conduit. In fact, it has been found that excessive fuel temperatures result even when such a coil is spaced from such a conduit when the coil and conduit are surrounded by a gaseous medium, such as air. As a result, temperature control of the coil is still required with this spaced arrangement when the purpose of the heater is to heat diesel fuel to prevent cold weather waxing. The broad essence of the present invention resides in the discovery that if such a coil is spaced from such a conduit and both immersed in a heat-conductive fluid, excellent fuel heating can be quickly and dependably achieved and the risk of overheating even under extreme conditions avoided.

PRIOR ART STATEMENT

Characterizing the closest prior art of which the applicant is aware and in compliance with 37 C.F.R. § 1.97 and §1.98, attention is invited to the following U.S. Pat. Nos:

Büchi, 1,384,512, July 12, 1921;
Brooks, 2,408,605, Oct. 1, 1946;
Zabenskie, 4,015,567, Apr. 5, 1977.

The Buchi U.S. Pat. No. 1,384,512 is believed relevant in its disclosure of a fuel line coiled about the exhaust pipe of a "heavy oil internal combustion engine." This arrangement is described as representing "any form of heating apparatus" and the coil is either in contact with the pipe or if spaced from it, is surrounded by the ambient atmosphere.

The Brooks U.S. Pat. No. 2,408,605 is believed relevant in its disclosure of a coiled fuel line within a canister mounted on an internal combustion engine exhaust pipe. The line is directly heated by a portion of the exhaust gases from the pipe which portion is detoured from the pipe by passages 14 and 15.

The Zabenskie U.S. Pat. No. 4,015,567 is believed relevant in its disclosure, in its Description of the Prior Art, of the heating of internal combustion engine fuel passing through a fuel line in a canister containing engine coolant. The canister and coolant are not heated by an exhaust pipe and this arrangement is said to be "superior in operation . . . because of the more moderate operating temperatures" of the coolant as opposed to the exhaust gases.

SUMMARY OF THE INVENTION

It is an object of the present invention to provide an improved method and apparatus for preheating fuel.

Another object is to provide for the heating of diesel fuel to a temperature sufficient to prevent fuel system blockage due to waxing while automatically limiting the maximum temperature of the heated fuel to prevent difficulties due to overheating.

Another object is to maintain the temperature of diesel fuel being heated to prevent waxing within tolerable upper and lower limits without the use of control elements and mechanisms.

Another object is to provide an apparatus which heats fuel returned from the engine to a fuel tank as well as fuel being supplied to the engine from the tank.

Another object is to minimize the need for changing diesel fuel filters in cold weather to prevent clogging by wax and other impurities.

Another object is to provide a method and apparatus for heating fuel having an intermediate heating fluid wherein substantial leakage of this fluid into the fuel will not damage an engine being supplied with the fuel.

A further object is to provide a method of heating diesel fuel adapted to be carried out in an apparatus which is easily installed on an existing vehicle, is rugged, dependable, economical, and fully effective in carrying out its intended purposes.

BRIEF DESCRIPTION OF THE DRAWINGS

FIG. 5 is an elevation of a second form of the apparatus embodying the principles of the present invention.

FIG. 6 is a horizontal section of the second form of the apparatus taken on line 6—6 of FIG. 5.

DESCRIPTION OF THE PREFERRED EMBODIMENT

First Form

Figure 2:
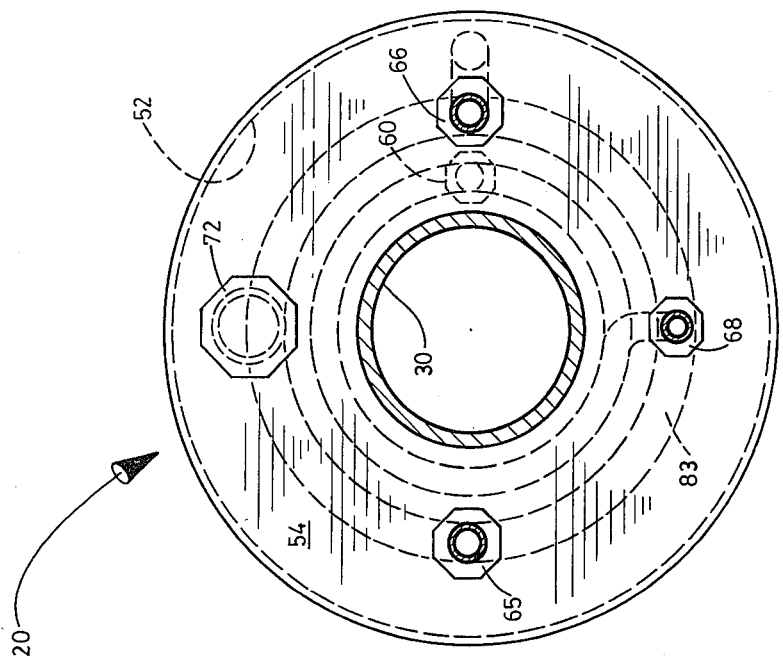
FIG. 2 is a horizontal section of the first form of the apparatus taken on line 2—2 of FIG. 1.
Figure 1:
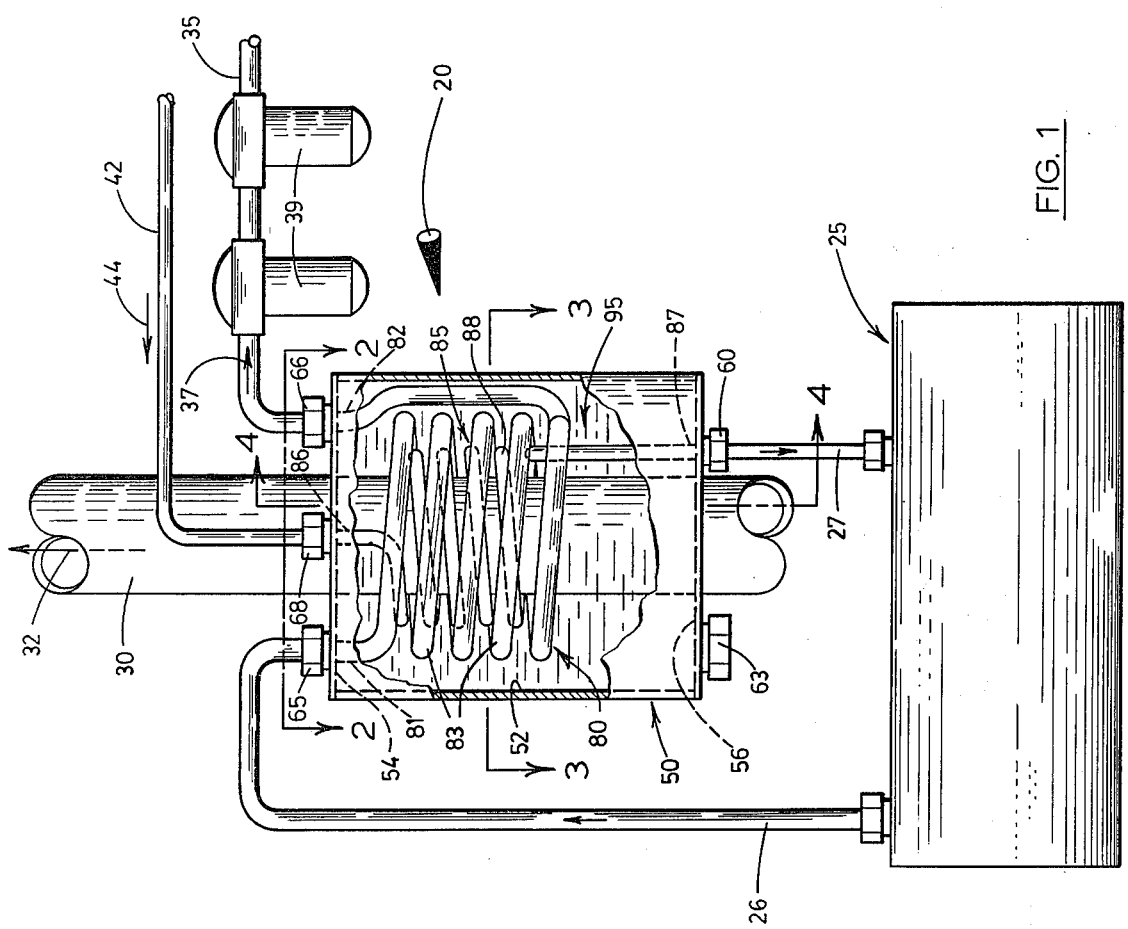
FIG. 1 is a schematic representation of a first form of the apparatus embodying the principles of the present invention in a representative operating environment.
Figure 4:
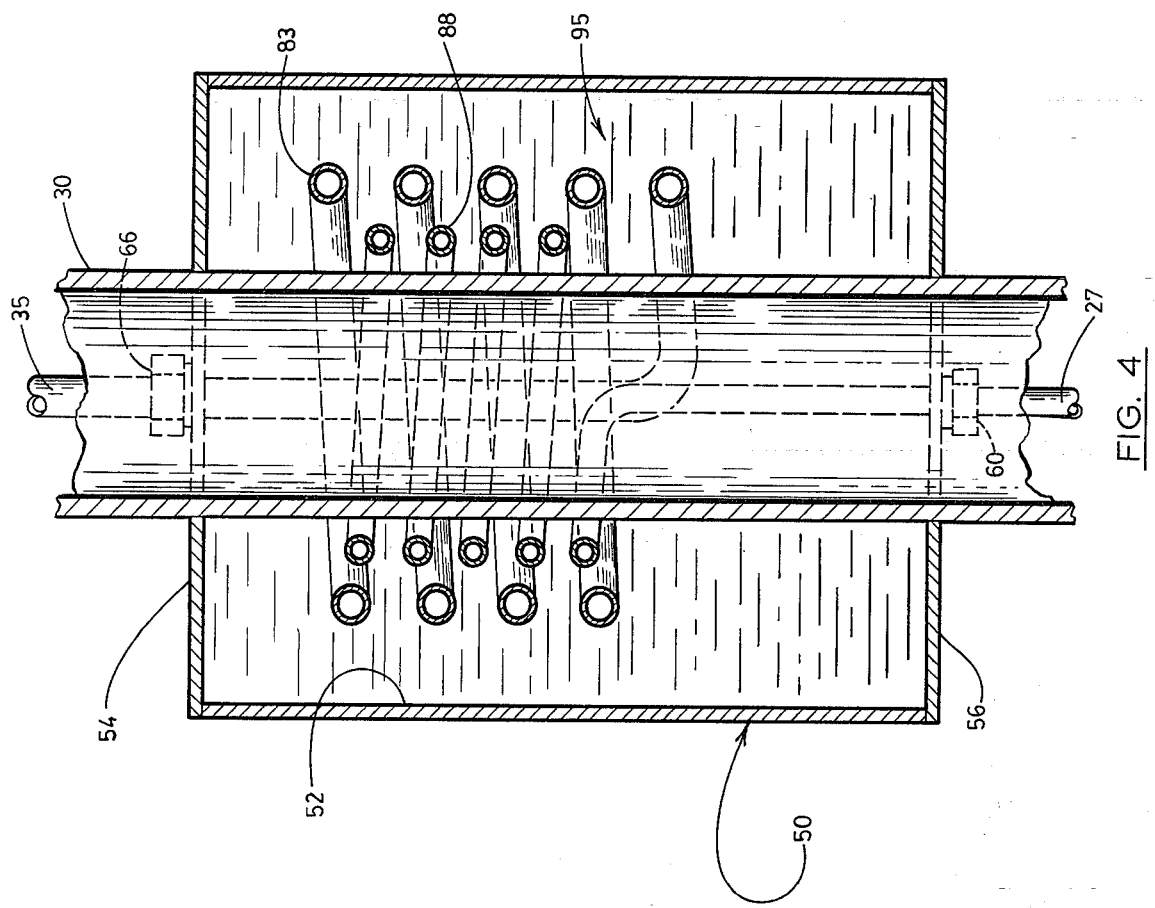
FIG. 4 is a vertical section of the first form of the apparatus taken on line 4—4 of FIG. 1.
Figure 3:
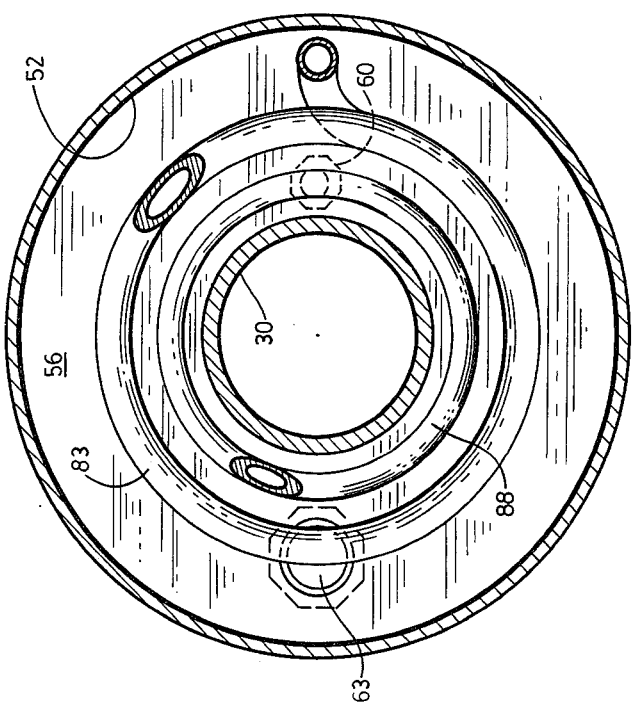
FIG. 3 is a horizontal section of the first form of the apparatus taken on line 3—3 of FIG. 1.
Figure 8:
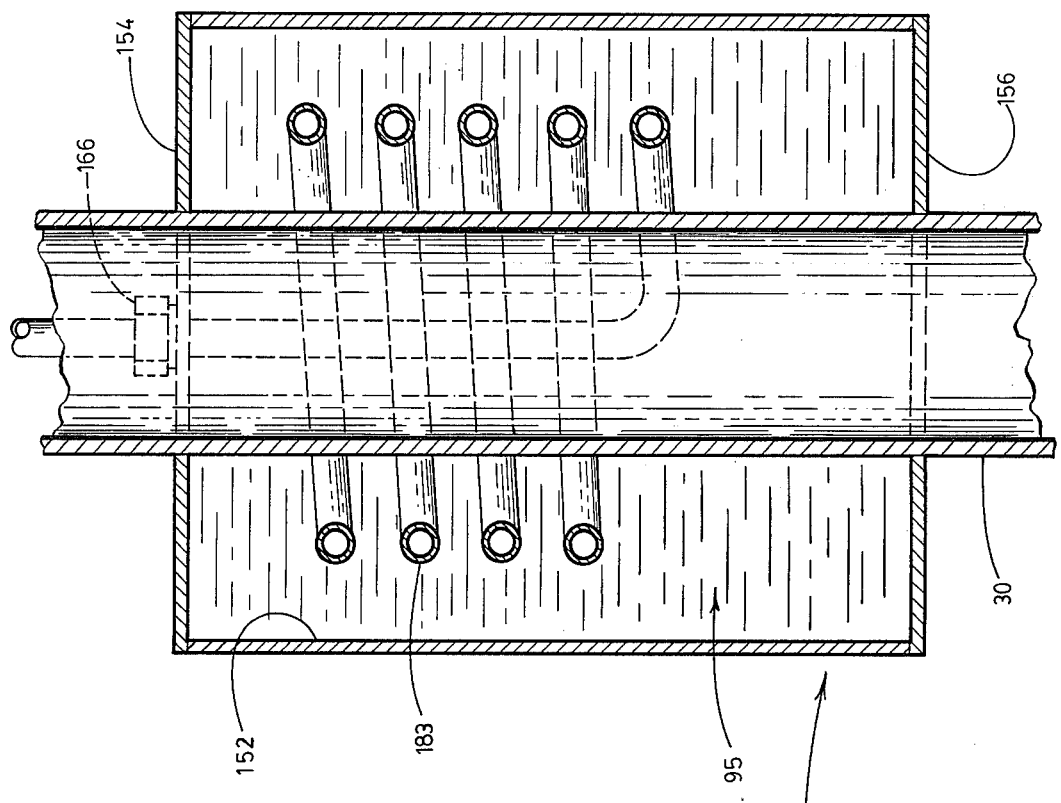
FIG. 8 is a vertical section of the second form of the apparatus taken on line 8—8 of FIG. 5.
Figure 7:
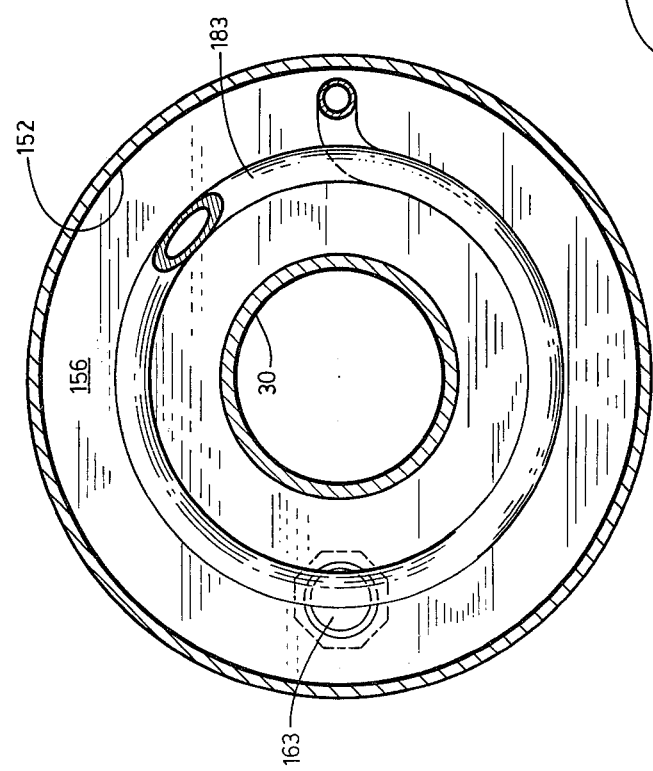
FIG. 7 is a horizontal section of the second form of the apparatus taken on line 7—7 of FIG. 5.

Referring more particularly to the drawings, an apparatus 20 of the first form of the present invention is shown in FIGS. 1 through 4. In FIG. 1, the apparatus is shown in an operating environment which includes a tank 25 for liquid diesel fuel. The tank is provided with a fuel supply line 26 and a fuel return line 27 which are connected to the apparatus in a manner subsequently to be described. The apparatus is mounted on an axially erect, fragmentarily represented, cylindrical exhaust conduit or pipe 30 of a well-known diesel internal combustion engine, not shown. The engine discharges heated exhaust through the pipe in the direction indicated by the arrow 32. The exhaust pipe is constructed of heat conductive metal such as is commonly used in exhaust pipes.

The engine is fueled by a fuel supply line 35 through which fuel is pumped from the tank 25 to the engine. The fuel line is provided with a pair of series connected fuel filters 39 of any desired type utilized with diesel engines and having minute openings for the effective removal of particulate matter from the fuel. As is well known in certain types of diesel engines, a substantial portion of fuel supplied through the fuel line is not burned by the engine, and this excess fuel serves to lubricate and cool the fuel injectors. The engine thus includes a fragmentarily represented fuel return line 42 through which the excess portion of the fuel exits from the engine, as indicated by the arrow 44. This return fuel is warmed somewhat in the engine but its temperature is too low to substantially raise the temperature of fuel in the tank 25 during weather in which the previously described danger of waxing is present.

Referring in greater detail to the apparatus 20, as shown in FIGS. 1 through 4, the apparatus includes a canister 50 which has a circumscribing, cylindrical side wall 52 concentrically mounted on the exhaust pipe 30 in radially spaced relation thereto. The canister is upwardly closed by an annular, planar, upper end wall 54 which interconnects the side wall and the exhaust pipe. The canister is downwardly closed by a lower end wall 56 which is substantially congruent to the upper end wall and is similarly disposed in relation to the side wall and the pipe. The end walls, typically, are welded to the side wall and the pipe, thereby mounting the apparatus and, more specifically, the canister on the exhaust pipe. The exhaust pipe is extended upwardly and downwardly from the canister to communicate in the usual manner with, respectively, the atmosphere and the engine. The walls of the canister are constructed of any suitable heat-conductive material.

The lower end wall 56 is provided with a conventional return outlet fitting 60 which extends through the wall in axially parallel relation to the exhaust pipe 30 and is spaced radially between the pipe and the side wall. This fitting is connected in fluid-flow relation to the return line 27 oppositely thereof from the tank 25. The lower end wall is also provided with a drain plug 63 screw-threadably engaged therein.

The upper end wall 54 is provided with a supply inlet fitting 65 and a substantially identical supply outlet fitting 66 which are spaced diametrically oppositely of the exhaust pipe. These fittings are conveniently axially parallel to the exhaust pipe 30. The inlet fitting is connected in fluid-flow relation to the supply line 27 oppositely of the tank 25 and the outlet fitting is connected in fluid-flow relation to the fuel supply line 35. Fuel can thus flow sequentially from the fitting and through the filters 39 for burning in the engine. The upper end wall is provided with a return inlet fitting 68 which is substantially identical to the fitting 60. The return inlet fitting extends axially through the end wall and is angularly spaced approximately equally from the supply fittings. The return inlet fitting is connected in fluid-flow relation to the fuel return line 42 to receive the excess portion of the fuel supplied to the engine. The upper end wall is also provided with a vented filter cap 72 which is screw-threadably engaged in the wall and is disposed diametrically opposite to the exhaust pipe from the return inlet fitting.

The apparatus 20 has a fuel line 80 disposed within the canister 50. This line has one end 81 connected in fluid-flow relation to the supply inlet fitting 65 and to the tank 25 through this fitting and the pipe 26. The fuel line has an opposite end 82 connected in fluid-flow relation to the supply outlet fitting 66 and to the engine through this fitting to the line 35 and the filters 39. The line has a helically coiled intermediate portion 83 which is at all points spaced from the exhaust pipe 30. This portion is disposed with the coil substantially coaxially aligned with the exhaust pipe and wound in circumscribing, radially spaced relation about the pipe. The line is spaced at all points from the side wall 52 and from the end walls 54 and 56, except where the line approaches the upper end wall for connection to the fittings 65 and 66. The coil is disposed in radially inwardly spaced relation to the side wall but is spaced substantially closer to the side wall than to the exhaust pipe. The fuel line is constructed of any suitable heat conductive material, such as steel tubing.

The apparatus 20 has a fuel return conduit or line 85 which is similar to the fuel line 80, being constructed of heat conductive material and disposed within the canister 50 and spaced at all points from the exhaust pipe 30 and the side wall 52. The return line has one end 86 which is connected to the fitting 68 and through it to the line 42 of the engine. The return line is thus adapted to receive the excess portion of the fuel supplied to the engine. Since the return line does not carry the portion of the fuel burned by the engine, it is substantially smaller in diameter than the fuel line. The return line has an opposite end 87 which is connected to the fitting 60 and through the fitting to the line 26 and the fuel tank 25. The return line has a helically coiled intermediate portion 87 which, radially, is disposed outwardly of the exhaust pipe and inwardly of the side wall and of the coiled intermediate portion 83 of the fuel line. The diameter of the return line coil is such that this coil is approximately midway between the fuel line coil and the exhaust pipe. The return line is spaced from the end walls 54 and 56 except where the line approaches the fitting 65 and 66.

The canister 50 is substantially filled with a heat transfer fluid 95 so that the exhaust pipe 30 is immersed in the heat transfer fluid between the end walls 54 and 56 and the respective intermediate portions 83 and 88 of the fuel line 80 and the return line 85. As previously described, the fuel line and the return line do not contact the canister or the exhaust pipe except at their ends 81, 82, 86, and 87, which are connected, respectively, to the fittings 65, 66, 68, and 60, and are spaced substantially from the canister 50 and the exhaust pipe.

As a result, the heat transfer fluid constitutes substantially the sole conductor of heat from the exhaust pipe to the fuel line and to the return line. The extent of heating of these lines from the exhaust pipe is therefore limited by the heat-conveying capacity of the heat transfer fluid.

The canister 50 is filled with the heat-conductive fluid 95 by removal of the filler plug 72 and for draining of the fluid by removal of the drain plug 63. This fluid, preferably, is oil, and it has been found that industrial oils which contain rust and oxidation inhibitors, anti-foam agents, anti-wear additives, shear stable viscosity index improvers, seal conditioners, pour-point depressants, fire retardants, 9-Octadeconoic acid and 9,12-Octadecadienoic acid, and dye, and which have a flash point of 400° F. (204.4° C.) and a pour point of −25° F. (−31.7° C.) are well suited to serve as the heat transfer fluid. Although a diesel engine will not run on such an oil, the engine will not be harmed if this oil enters the fuel line 80 due to a leak in the apparatus 20.

Second Form

A second form of apparatus of the present invention is designated by the numeral 120 and is shown in FIGS. 5 through 8 mounted on an exhaust pipe 30. The second form is for use where it is not desired to heat excess fuel returned from a diesel engine to a fuel tank. The second form is, therefore, similar to the first form of apparatus 20 in form and materials and is utilized in a similar operating environment except that the elements required to conduct and to heat the return fuel are not present in the second form.

The apparatus 120 has a canister 150 having a cylindrical side wall 152 concentrically mounted on the pipe 30 by an upper end wall 154 and a lower end wall 156. The lower end wall is provided with a drain plug 163 and the upper end wall is provided with an inlet fuel supply fitting 165, an outlet fuel supply fitting 166, and a filler plug 172. The inlet fitting is adapted for connection to a fuel tank similar to the tank 25 and the outlet fitting is adapted for a connection to a diesel engine for supplying fuel from the tank through the apparatus to the engine.

The apparatus includes a fuel line 180 disposed within the canister 150 and having opposite ends 181 and 182, respectively, connected in fluid-flow relation to the fittings 165 and 166. This line is spaced from the exhaust pipe 30 and the interior of the canister. The fuel line has a helically coiled intermediate portion 183 which is concentrically related to the pipe and is radially outwardly spaced therefrom and radially inwardly spaced from the side wall 152. The canister 150 is substantially filled with the heat transfer fluid 95 which, as in the apparatus 20, is substantially the sole conductor of heat from the exhaust pipe 30 to the fuel line 180. The heating of the fuel line from the exhaust pipe is thus limited by the heat-conveying capacity of the fluid.

OPERATION

The operation of the described embodiments and the method of the subject invention are believed to be clearly apparent and are briefly summarized at this point. In the first form of apparatus 20, when the engine is in operation, hot exhaust passes through the pipe 30 and heats it so that heat conducted through the pipe is transferred to the fluid 95 in which the pipe is immersed. The fuel line 80 and the return line 85 are in turn heated by the heated fluid due to their immersion therein. Fuel passing from the tank 25 to the engine through the heated fuel line is in turn heated by heat conducted through this line as the fuel flows toward the filters 39. Return fuel passing from the engine to the tank is, similarly, heated by the return line before returning to the tank to minimize wax crystallization and/or separation in the tank.

As previously described, the fluid 95 provides substantially the sole path for conduction of heat to the lines 80 and 85 from the pipe 30. The lines and the fuel therein cannot, therefore, attain a higher temperature than the fluid, and the temperature of the lines is limited, in any event, by the heat conveying capacity of the fluid. Heat from the pipe 30, which is in excess of the required for heating fuel in the lines, is conducted to the canister 50 where it is dissipated into the ambient atmosphere. As a result of these factors, the excess heat does not raise the temperature of fuel in the line substantially above 100° F. (37.8° C.). When the temperature of the exhaust pipe decreases, less excess heat is disspated so that sufficient heat is available to the fuel line to maintain the temperature of the fuel being supplied to the engine above 60° F. (15.6° C.). The fuel is thus preconditioned for burning in the engine and wax does not form in the fuel and block the filters 39. There is thus not need to replace the filters any more often than is required for the filtration of other impurities.

It will be noted that the heat transfer factors described in the previous paragraph are not dependent on the rate of change of exhaust temperature so that the temperature of the supplied fuel remains within the desired range despite rapid or frequent changes in engine load.

Similar considerations limit the temperature extremes of the fuel returning to the tank 25 through the return line 85 of the first form of apparatus 30. The return fuel is immediately mixed with the cooler fuel in the tank so that the temperature of the fuel in the tank does not rise substantially above 60° F. (15.6° C.). The fuel temperature in the tank is, however, raised to facilitate the removal of any water in the fuel and permit particulate impurities in the tank to settle out.

The operation of the second form of apparatus 120 is substantially identical to that of the apparatus 20 except that there is no return line 85 to be heated. The heat transfer conditions in the second form of apparatus result in the temperature of fuel being supplied to the engine through the line 180 being maintained substantially between 60° F. and 100° F. (15.6° C. and 32.8° C.). Both forms of the apparatus thus maintain the temperature of fuel being heated therein within the desired range without the use of a heat sensor or movable elements or any other elements which are relatively fragile or subject to wear.

If in either apparatus 20 or 120, a significant amount of the heat transfer fluid 95 leaks into the fuel line 80 or 180, the engine will stop. The engine is thus protected from any difficulties due to running on fuel which has become overheated by passage through the fuel line under circumstances where the temperature thereof is not limited by the presence of the fluid to dissipate excess heat in the manner previously described.

EXAMPLE

A fuel preheating apparatus was constructed according to the principles of the present invention and tested on a commercial motor vehicle. The vehicle was a truck tractor and trailer having a weight of approximately 75,000 pounds and powered by a diesel engine exhausting through a pipe substantially five inches in diameter. The pipe was fitted with a canister, similar to the canister 50, substantially eight inches in diameter and six inches in length holding three quarts of heat transfer fluid 95. The following table gives the results achieved with this equipment over a total of 3,200 miles. The temperatures given are in degrees Fahrenheit and were checked every half hour during operation.

| Environmental Temperature | Exhaust Temp. Just Before Canister | Temp. of Fluid in Canister | Fuel Temp. Just Before Filters | Operating Circumstances |
| --- | --- | --- | --- | --- |
| +10 | 600 | 110 | 30 | cold start |
| +8 | 700 | 130 | 68 | |
| +15 | 750 | 145 | 83 | |
| +18 | 700 | 130 | 78 | |
| +18 | 840 | 180 | 105 | hill pull |
| +10 | 600 | 110 | 70 | level |
| +8 | 600 | 110 | 75 | level |
| +6 | 650 | 125 | 84 | |
| +8 | 575 | 110 | 77 | |
| +7 | 650 | 110 | 85 | |
| +9 | 575 | 100 | 72 | |
| +3 | 675 | 130 | 95 | hill pull |
| −4 | 680 | 130 | 80 | hill pull |
| −4 | (Dinner Stop - Tank Temp. 68°) | | | |
| +1 | 300 | 100 | 80 | idle |
| −4 | 600 | 100 | 70 | |
| −9 | 400 | 120 | 70 | fog, 35 mph |
| −3 | 825 | 140 | 86 | hill pull |
| 0 | 650 | 120 | 60 | 65 mph |
| +10 | 850 | 150 | 105 | hill pull |
| +8 | 600 | 100 | 75 | fog, 40 mph |
| +14 | 700 | 100 | 75 | hill |
| +12 | 600 | 110 | 78 | fog |
| +16 | 600 | 100 | 80 | level |

It will be noted that except at the start, the fuel temperature was maintained at 60° F. (15.6° C.) or above at all times. Although the exhaust temperature fluctuated between 300° F. (148.9° C.) and 850° F. (454.4° C.), the fuel temperature stayed between 60° F. (15.6° C.) and 105° F. (40.6° C.). The temperature of the heat transfer fluid 95 remained between 100° F. (37°–38° C.) and 140° F. (60° C.). Other tests have shown that at higher environmental temperatures and higher exhaust temperatures, the fluid temperature in the canister and the fuel temperature did not increase objectionably, the inefficient heat transfer of the fluid in the canister serving to hold maximum fuel temperatures to a safe level while dissipating excess heat to the atmosphere.

Thus, the method and apparatus of the present invention insure sufficient fuel heating to minimize fuel blockage incident to wax crystallization and/or separation and to preclude excessive fuel heating even under extreme conditions; facilitate heating of fuel returned to the tank as excess; are safe to employ in that leaking of heat transfer fluid into the fuel, if such ever occurs, simply shuts the engine down without damage thereto; are safe to employ in that depletion of the heat transfer fluid in the canister so that the fuel line and the return line are no longer isolated by the heat transfer fluid from each other and from the canister, is such ever occurs, causes fuel temperature temporarily to increase and shut down the engine; are easily employed; do not subject the exhaust to either increase or decrease in back pressure from that originally engineered into the stack in relation to the engine involved; and fully achieve the objects and advantages intended.

Although the invention has been shown and described in what are conceived to be the most practical and preferred methods and apparatus, it is recognized that departures may be made therefrom within the scope of the invention, which is not to be limited to the illustrative details disclosed.

Having described our invention, what we claim as new and desire to secure by Letters Patent is:

1. In combination with an internal combustion engine having a substantially cylindrical exhaust pipe of heat-conductive material through which heated exhaust is discharged and a fuel supply, said engine being characterized by return to the fuel supply of excess fuel supplied thereto:
   A. a canister having a substantially cylindrical wall mounted substantially concentrically on the exhaust pipe;
   B. a fuel line of heat-conductive material having one end connected to the fuel supply, an opposite end connected to the internal combustion engine, and an intermediate portion within the canister helically wound about the exhaust pipe in radially spaced relation thereto;
   C. a fuel return line having one end connected to the engine adapted to receive fuel returned thereby, an opposite end connected to the tank and an intermediate portion within the canister helically wound about the exhaust pipe, the intermediate portions of the fuel line and the return line being in outwardly spaced relation to the exhaust pipe and in radially inwardly spaced relation to the wall of the canister; and
   D. a heat transfer fluid in the canister having the intermediate portion of the fuel line and of the return line immersed therein and constituting substantially the sole conductor of heat from the exhaust pipe to the fuel line and the return line in the canister.

2. In combination with a diesel engine having a substantially cylindrical axially erect exhaust pipe of heat-conductive material and a fuel tank, said engine being characterized by return of excess fuel supplied thereto:
   A. a canister having a substantially cylindrical side wall mounted substantially concentrically on the exhaust pipe;
   B. a fuel line of heat conductive material having one end connected to the tank, an opposite end connected to the engine, and an intermediate portion within the canister wound about the exhaust pipe;
   C. a fuel return line having one end connected to the engine adapted to receive fuel returned thereby, an opposite end connected to the tank, and an intermediate portion in the canister wound about the exhaust pipe, the intermediate portions of the fuel line and the return line being in radially outwardly spaced relation to the exhaust pipe and in radially inwardly spaced relation to the side wall of the canister; and
   D. a heat transfer fluid in the canister having the intermediate portions of the fuel line and the return line immersed therein and constituting substantially the sole conductor of heat from the exhaust pipe to the fuel line and from the exhaust pipe to the return line whereby the heating of said lines is limited by the heat-conveying capacity of the heat transfer fluid.

3. In combination with an internal combustion engine having an exhaust pipe of heat-conductive material and a fuel tank, said engine being characterized by return of excess fuel supplied thereto:
   A. a canister having a wall mounted in circumscribing spaced relation to the exhaust pipe;
   B. a fuel line of heat conductive material having an end connected to the tank, an opposite end connected to the engine, and an intermediate portion within the canister wound about the exhaust pipe;
   C. a fuel return line of heat conducting material having one end connected to the engine adapted to receive fuel returned thereby, an opposite end connected to the tank, and an intermediate portion within the canister wound about the exhaust pipe, the intermediate portions of the fuel line and the return line being in outwardly spaced relation to the exhaust pipe and in inwardly spaced relation to the wall of the canister; and
   D. a heat transfer liquid in the canister having the intermediate portions of the fuel line and the return line immersed therein and constituting substantially the sole conductor of heat from the exhaust pipe to the fuel line and from the exhaust pipe to the return line whereby the heating of said lines is limited by the heat-conveying capacity of the heat transfer liquid.

* * * * *